US009165445B2

(12) United States Patent
Hinkel

(10) Patent No.: US 9,165,445 B2
(45) Date of Patent: Oct. 20, 2015

(54) OMNIBUS CAMERA

(75) Inventor: Ralf Hinkel, Hoeringen (DE)

(73) Assignee: MOBOTIX AG, Winnweiler (DE)

( * ) Notice: Subject to any disclaimer, the term of this patent is extended or adjusted under 35 U.S.C. 154(b) by 385 days.

(21) Appl. No.: 13/133,072

(22) PCT Filed: Dec. 23, 2009

(86) PCT No.: PCT/DE2009/001811
§ 371 (c)(1),
(2), (4) Date: Sep. 20, 2011

(87) PCT Pub. No.: WO2010/072214
PCT Pub. Date: Jul. 1, 2010

(65) Prior Publication Data
US 2012/0002048 A1 Jan. 5, 2012

(30) Foreign Application Priority Data
Dec. 23, 2008 (DE) ........................ 10 2008 062 997

(51) Int. Cl.
*H04N 7/18* (2006.01)
*G08B 13/196* (2006.01)

(52) U.S. Cl.
CPC .... *G08B 13/19647* (2013.01); *G08B 13/19626* (2013.01); *G08B 13/19628* (2013.01)

(58) Field of Classification Search
CPC .................. G08B 13/19626; G08B 13/19628; G08B 13/19647
See application file for complete search history.

(56) References Cited

U.S. PATENT DOCUMENTS

| | | | | |
|---|---|---|---|---|
| 5,643,476 | A * | 7/1997 | Garmire et al. | 219/121.68 |
| 5,691,765 | A | 11/1997 | Schieltz et al. | |
| 6,226,035 | B1 * | 5/2001 | Korein et al. | 348/335 |
| 7,629,996 | B2 * | 12/2009 | Rademacher et al. | 348/148 |
| 7,929,221 | B2 * | 4/2011 | Ning | 359/753 |
| 2002/0080033 | A1 | 6/2002 | Shepher | |
| 2002/0145524 | A1 | 10/2002 | Shepher | |
| 2002/0196330 | A1 * | 12/2002 | Park et al. | 348/49 |
| 2003/0041329 | A1 * | 2/2003 | Bassett | 725/105 |
| 2004/0061780 | A1 * | 4/2004 | Huffman | 348/148 |
| 2005/0104958 | A1 * | 5/2005 | Egnal et al. | 348/143 |
| 2006/0187305 | A1 * | 8/2006 | Trivedi et al. | 348/169 |
| 2010/0141733 | A1 | 6/2010 | Borchers et al. | |

FOREIGN PATENT DOCUMENTS

| | | |
|---|---|---|
| DE | 197 57 497 | 7/1999 |
| DE | 10 2007 013 238 | 9/2008 |

(Continued)

OTHER PUBLICATIONS

GIA Austria GmbH: "OEBB—Postbus—GmbH . . . Sicher Unterwegs Mit GIA . . .", XP-002585191, (Nov. 30, 2007).

(Continued)

*Primary Examiner* — Dave Czekaj
*Assistant Examiner* — Mohammad J Rahman
(74) *Attorney, Agent, or Firm* — Oblon, McClelland, Maier & Neustadt, L.L.P.

(57) ABSTRACT

The invention relates to a camera arrangement having at least one wide-angle camera for monitoring an elongated space, and to a mount for the camera. It is provided in this case that the mount is designed for directing the wide-angle camera with a field of view of low distortion onto distant parts of space, and for directing the wide-angle camera with a field of view of higher distortion onto closer parts of space.

3 Claims, 1 Drawing Sheet

(56) References Cited

FOREIGN PATENT DOCUMENTS

| | | |
|---|---|---|
| DE | 10 2007 013 239 | 9/2008 |
| WO | 99 45422 | 9/1999 |

OTHER PUBLICATIONS

International Search Report Issued Jun. 28, 2010 in PCT/DE09/001811 filed Dec. 23, 2009.

* cited by examiner

OMNIBUS CAMERA

The present invention relates to what is claimed in the preamble, and therefore relates to camera arrangements and methods for taking pictures.

Camera arrangements are known, and are particularly used in monitoring. In this case, it is desired, on the one hand, to observe with high resolution; on the other hand, it is desired to keep the outlay on apparatus low.

In order to observe with high resolution, it is typical to provide a large number of cameras which respectively monitor different areas. However, this has the disadvantage that the outlay on camera equipment, on picture taking, on display etc. is high, and that the arrangement is conspicuous owing to the multiplicity of locations at which the cameras are arranged.

Because of this high outlay, it has already been proposed that an area of space to be observed be detected with the aid of a wide-angle camera that typically has a field of view of 180°, that is to say is hemispherical, and then to re-equalize the pictures taken, which have been distorted by the wide angle lens. The equalization algorithms are known per se. The cameras can be arranged on ceilings and therefore scarcely intrude. However, this arrangement is problematic in the monitoring of elongated passageways and the like, such as corridors, buses or train compartments, because there is high image distortion in the distant edge regions.

It would be desirable to specify a monitoring option that delivers good image quality even in elongated spaces despite panoramic monitoring.

The object of the present invention consists in providing innovation for commercial application.

There is an independent claim for achievement of this object; preferred embodiments are to be found in the subclaims.

The invention therefore proposes that, in the case of a camera arrangement having at least one wide-angle camera for monitoring an elongated space, and of a mount for the camera, it be provided that the mount is designed for directing the (digital) wide-angle camera with a field of view of low distortion onto distant parts of space, and for directing the (digital) wide-angle camera with a field of view of higher distortion onto closer parts of space.

The invention thus utilizes the fact that for the distant parts of space for which even large objects are detected only with a small angular distance, there is no need for these also to be equalized, whereas an equalization is undertaken in the case of close areas of space in which objects are always detected with a large angular distance. Since, up close, the same object occupies a larger viewing angle, it is taken with a still comparatively large number of pixels, even when it is detected only in the strongly distorted edge region of the wide-angle camera. However, it is thus still possible to obtain a good image quality in equalizing the picture.

The result of this overall is that a good optical imaging quality is provided for distant areas in which the objects are detected only at a small angular distance, while the equalizability improved by the multiplicity of pixels is used for close objects that are detected at a large angular distance with many pixels. It is therefore possible to attain W an overall higher image quality that is more uniform above all for all areas of space, and this increases reliability in conjunction with the lowest possible outlay precisely in elongated spaces.

It is preferred when the mount is configured such that the optical axis of the wide-angle camera is directed onto a distant area, typically the end of the area. Since the image quality of a camera is typically best along the optical axis, it is thereby achieved that the effects described are realized in an optimum way.

The wide angle typically has viewing angles far above 90°, preferably 180° or close to 180°.

It is preferred, furthermore, when two individual wide-angle cameras are provided back to back, and the mount is provided for fastening near the middle of the elongated area of space. Thus, it is possible to conduct a particularly effective monitoring that also has no gaps in elongated spaces. The two cameras arranged back to back can, but need not, be aligned exactly on one and the same axis. Alignment that is not exactly identical is more advantageous, because it is then also possible to use objectives covering less than 180° to detect space even under the camera, possibly even with an overlap, and this is advantageous for producing a seamless image from two individual images. This may be disclosed as possible and preferred. At the same time, the image resolution of the walls of an area of a passageway is further improved, at least slightly, when the respective optically axis is not aligned exactly horizontally along a ceiling or similar, but is inclined downwards.

The invention is described below only by way of example with the aid of the drawing, in which.

Figure 1:
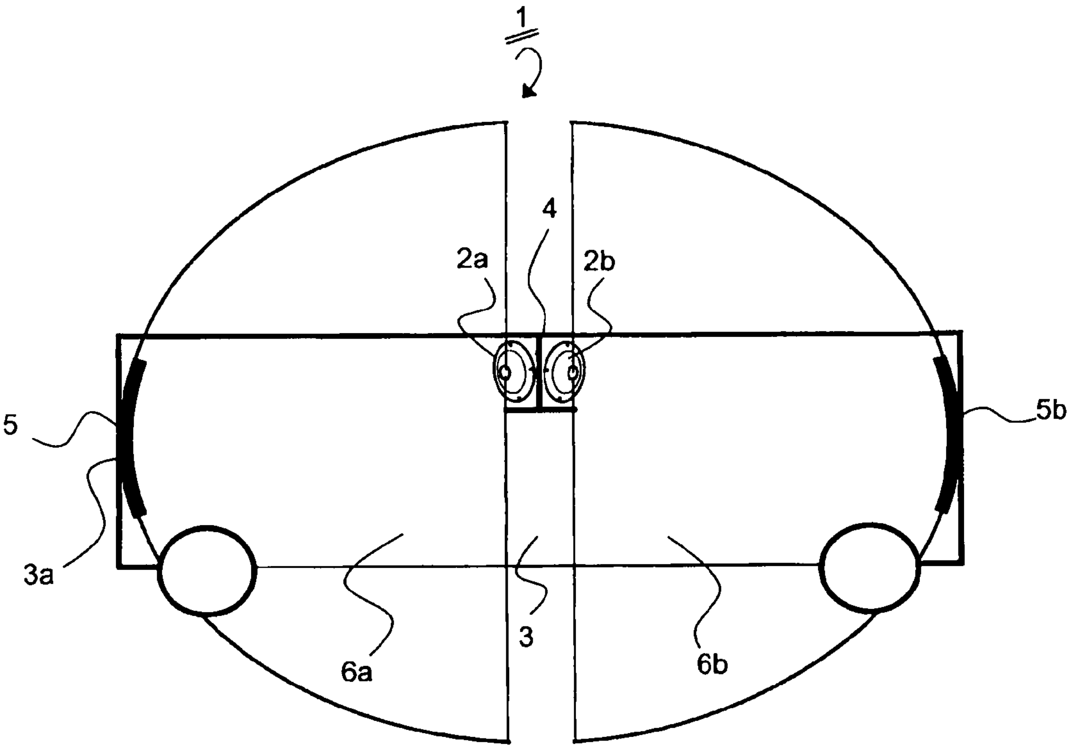
FIG. 1 shows an exemplary embodiment of the present invention.

According to FIG. 1, a camera arrangement 1 denoted in general by 1 comprises a wide-angle camera 2*a* for monitoring an elongated space 3, and a mount 4 for the camera, the mount being designed for directing the wide-angle camera 2*a* with a field of view of low distortion 5 onto distant parts of space 3*a*, and for directing the wide-angle camera with a field of view of higher distortion 6 onto closer parts of space.

In the present case, the camera arrangement 1 is arranged in the middle of the passageway of a train conveying passengers in order to monitor the interior of a carriage permanently.

The mount 4 is fitted on the ceiling of a passageway, specifically so that two to this extent identical wide-angle cameras 2*a*, 2*b* are directed back to back onto opposite ends of the passageway. The camera 2*b* is aligned in this case exactly as is the camera 2*a* so that a field of view of low distortion 5*b* is directed onto a distant area of space 3*b*, and a field of view 6*b* of higher distortion is directed onto closer parts of space.

It is possible to observe the passageway even directly below the mount 4 owing to the use of wide-angle cameras. To this extent the purely schematic drawing is not exact. This results, firstly, in a detection of the entire elongated passageway of the carriage 3 as in the prior art, in which only a single wide-angle camera is mounted on the ceiling, but in such a way that the area of most acute vision is arranged directly below the camera, as indicated by A, and the areas B and C are still taken only with distortion.

The inventive camera arrangement described can now be used to obtain images of constantly high quality in the entire passageway. This is possible in distant areas because the objects are, specifically, observed at a small angular spacing and the result of this on a camera sensor is typically that the quantity of pixels available for an object is not particularly large. In the areas in which the objects lie closer, for example the areas 6*a* or 6*b*, the objects such as, for example, faces of passengers, are observed at a larger angular spacing, but are distorted. However, owing to the large quantity of available pixels, equalization is possible without difficulty, and so a high quality of observation is obtained even here.

Figure 2:
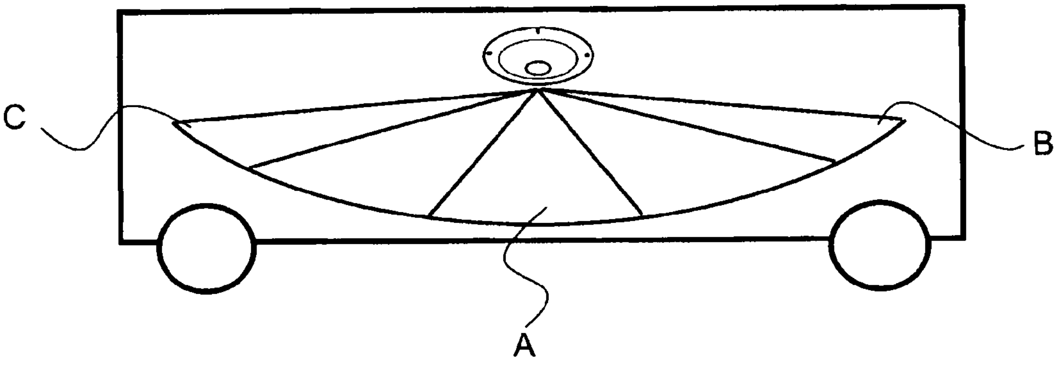
FIG. 2 shows an arrangement of a wide-angle camera in a bus in accordance with the prior art.

The image quality is therefore significantly better over the entire area than in the case of the conventional arrangement of FIG. 2, in which it is merely close to the camera that a high imaging quality is obtained in the only slightly distorted area.

The invention claimed is:

1. A camera arrangement having at least one wide angle camera for continuous surveillance of passengers in an elongated space of a bus or train corridor, comprising:

a first wide angle camera;

a second wide angle camera; and a mount configured to mount the first and second wide angle cameras on a ceiling of the elongated space such that the cameras are arranged back to back, are not aligned on one and the same axis and with each wide angle camera directed onto a respective distant area of the elongated space such that each wide-angle camera has a field of view of low distortion directed onto distant parts of space to detect objects with small angular distance to obtain good image quality without the need for equalization, and has a field of view of higher distortion directed onto closer parts of the elongated space to detect objects with large angular distance using a comparatively large numbers of pixels sufficient to obtain good image quality by equalization of said distortion, wherein the field of view of the first wide angle camera overlaps the field of view of the second wide angle camera in an area below the camera arrangement to allow for generation of one seamless image from two single images.

2. The camera arrangement according to claim 1, wherein the mount is configured to be fastened near the middle of the elongated space.

3. The camera arrangement according to claim 1, wherein the mount is configured to direct an axis of each camera at an inclined angle.

* * * * *